Dec. 4, 1951 — J. J. SAINZ — 2,576,971
BRAKE ADJUSTER
Filed May 6, 1947
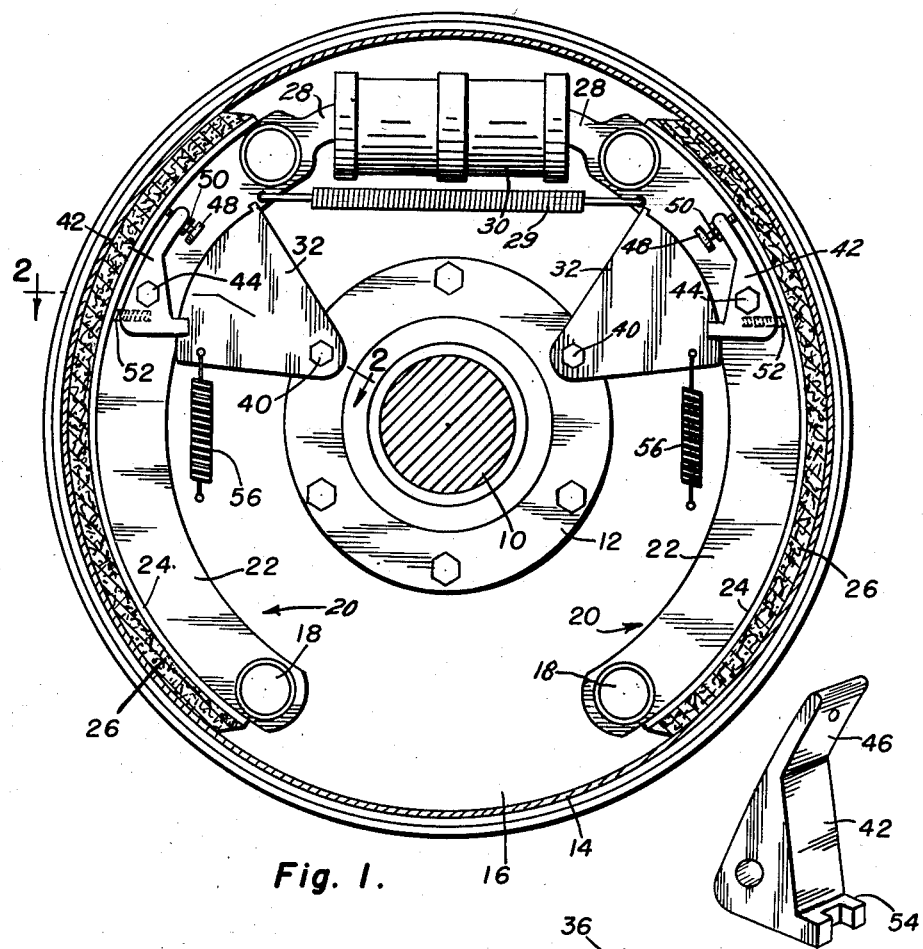
Fig. 1.
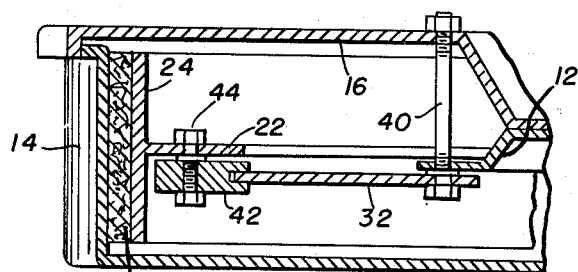
Fig. 2.
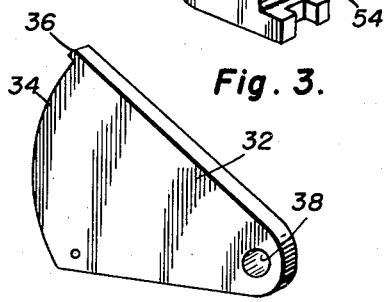
Fig. 3.
Fig. 4.
Inventor
Joseph J. Sainz
By Clarence A. O'Brien
and Harvey B. Jacobson
Attorneys Patented Dec. 4, 1951

2,576,971

UNITED STATES PATENT OFFICE 2,576,971

BRAKE ADJUSTER

Joseph J. Sainz, New York, N. Y.

Application May 6, 1947, Serial No. 746,376

4 Claims. (Cl. 188—79.5)

This invention relates generally to braking mechanism, and more particularly to a brake adjuster for use with a brake drum, a brake shoe having web and arcuate flange portions and operated hydraulically, and comprising a cam member adapted to frictionally engage a lever pivotally mounted on the web portion, so as to allow for adjustment of this lever relative to the said flange portion, whereby this lever may be given accurate initial adjustment, and thereafter co-act with said cam to preserve the brake shoe in properly spaced position relative to the brake drum, as the brake shoe frictional lining is gradually worn down in service.

A primary object of this invention is to provide means of this character which is adapted for accurate initial setting of the brake shoes to provide for proper clearance between the frictional lining and the brake drum.

Another object of this invention is to provide means of this character which will provide a progressive locking of the brake shoe against unduly great retractive movement away from the brake drum, but will not prevent the normally provided retracting springs from properly retracting the brake shoes, when the brakes are not applied or used.

A still further object of this invention is to provide a brake adjusting means which will automatically adjust the clearance of the brake lining, but which is adapted for convenient adjustment subsequent to the initial adjustment, at any time when the wheels of the vehicle have been removed.

And a last object to be specifically mentioned is to provide a device of this character which is relatively inexpensive and practicable to manufacture, extremely simple to install and use and to adjust when necessary, and which will give generally efficient and durable service.

With these objects definitely in view, this invention resides in certain novel features of construction, combination and arrangement of parts and portions as will be hereinafter described in detail, and particularly set forth in the appended claims, reference being had to the accompanying drawings which form a material part of this application, and in which:

Figure 1 is a front elevational view of a portion of a wheel equipped with a standard brake drum, and apparatus for hydraulically applying lined brake shoes onto said drum, the figure including the subject matter of this invention, operatively applied thereto, and the axle of the wheel and the brake drum being shown in section;

Figure 2 is a horizontal sectional view, fragmentary in character, and taken on the line 2—2 in Figure 1;

Figure 3 is a perspective view of the member hereinafter referred to as the lever;

Figure 4 is a perspective view of the cam member.

Similar characters of reference designate similar or identical parts and portions throughout the specification and throughout the views of the drawing.

Referring now to the drawing in detail, it will be noted that the environment wherewith this invention is adapted to be used includes an axle 10, the brake drum 14, and a disc-like portion of the axle assembly hereinafter referred to as the fixed back plate 16. Other standard equipment includes the anchor pins 18 and the brake shoes, generally indicated by the numeral 20 and comprising web portions 22 and arcuate flange portions 24. Frictional brake lining 26 is secured, as by the conventional method of riveting, to the curved flange portion 24 of the brake shoes. The upper ends of the brake shoes, as illustrated in Figure 1, are pivotally secured to piston-actuated members 28 associated with the hydraulic cylinder 30, and a brake shoe retracting spring 29 is secured under tension between the brake shoes, all according to conventional practice.

This invention contemplates the provision of a cam 32 of generally triangular shape having a working face 34, terminating in a lip 36, and an aperture 38 adapting this cam for pivotal attachment as by the pin 40, to a suitable support represented as an annular plate 12 secured as by welding to the fixed back plate 16 and having an offset portion substantially co-planar with the webs 22, but this portion of the device may be altered to suit the varying constructions encountered in applying the invention to different types of axle assemblies.

The lever 42 is pivotally secured by a pin 44 to the web portion 22 of the brake shoe, the pin 44 being positioned intermediate the ends of the lever. One end of this lever is in the form of a flat plate 46 and is drilled and tapped to receive a set screw 48 which is equipped with a locking nut 50. It will be noted that the end of the set screw 48 is adapted to contact the inner surface of the curved flange portion 24 of the brake shoe. The other end of this lever 42 is drilled to receive a helical spring 52, the simple recess provided for reception of this spring being disposed so that this spring will bias the one end of the lever outwardly from the flange portion 24 of the brake shoe, against which one end of the spring is made to abut.

A right angularly disposed portion of the lever 42 terminates in the bifurcated portion 54, the working face 34 of the cam 32 being receivable in this bifurcated portion 54 of the lever. It will be noted that pivotal movement, as downwardly in Figure 1, of the cam 32 will tend to compress the spring 52 and thus gently urge the brake shoe concerned outwardly or radially toward the brake drum 14. The immediately above referred to action of the cam is that desired, and the cam 32 is constantly biased to pivot in the said direction by a helical spring 56, secured to and between the cam 32 and a contiguous portion of the fixed back plate 16, the cam and plate 16 being apertured to receive ends of this spring 56.

The operation of this invention will be clearly understood from the foregoing description of the mechanical details thereof, taken in connection with the above recitation of the objects sought to be achieved by this invention but, in recapitulation, it may be expedient to add that the said set screw 48 is adjusted to provide for proper spacing of the lining 26 from the brake drum 14, when the parts are initially assembled, or when new frictional brake linings have been installed. Thereafter, the spring 56 will constantly urge the cam 32 into contact with the bifurcated portion 54 of the lever 42, maintaining a yieldable pressure upon the flange 24 of the brake shoe, through the agency of the helical spring 52. Upon the release of the brakes, the brake shoes 22 are prevented from retracting a greater distance than necessary, under the influence of the retracting springs 29 secured under tension between the two brake shoes. The advantages of this result are obvious, and in the application to ordinary motor vehicles, the advantages include prevention of undue movement of the brake pedal.

A cycle of operation may be considered as beginning with the various elements in the positions assumed when the brakes are applied, as indicated in Figure 1. Release of pressure in the cylinder 30 will allow the spring 29 to retract the brake shoes and the cams 32 prevent one end of each lever 42 from moving inwardly, resulting in compression of the springs 52 and the pivoting of the levers 42 with reference to the web portions 22 of the brake shoes. The cams 32 will not necessarily pivot downwardly at each application of the brakes but will inch downwardly as the lining is decreased in thickness due to wear and the cams may be thought of as moving through an infinitesimally small angle each time the brakes are re-applied.

Though there has been shown a particular embodiment of this invention, this application is not limited to this particular embodiment, but it is desired to include in the scope of this invention the construction, combination and arrangement of parts and portions substantially as set forth in the appended claims.

Having thus described this invention, what is claimed as new is as follows:

1. A brake adjuster for use with a brake drum, a brake shoe having web and arcuate flange portions and a fixed back plate, comprising a plate secured to said back plate and having an offset portion, a cam pivoted on said offset portion, a lever pivoted intermediate the ends thereof on said web portion, one of said ends being in frictional engagement with said cam, the other of said ends having a member contacting the inner surface of said flange, spring means to bias said one end outwardly from said flange, and further spring means to bias said cam into engagement with said one end.

2. An adjuster according to claim 1 and wherein said member is a set screw, whereby said other of said ends may be adjusted as to the position thereof relative to the arcuate flange when the brakes are applied.

3. An adjuster according to claim 1 and wherein said further means comprises a helical spring secured under tension between said cam and an adjacent portion of said fixed back plate.

4. An adjuster according to claim 1 and wherein said one of said ends is bifurcated to guide said cam, and said cam has a stop to limit the movement of the cam relative to the lever.

JOSEPH J. SAINZ.

REFERENCES CITED

The following references are of record in the file of this patent:

UNITED STATES PATENTS

| Number | Name | Date |
|---|---|---|
| 1,798,360 | Sneed | Mar. 31, 1931 |
| 2,214,679 | Scott | Sept. 10, 1940 |
| 2,215,568 | Schnell | Sept. 24, 1940 |
| 2,259,835 | Schnell et al. | Oct. 21, 1941 |
| 2,421,802 | Mould | June 10, 1947 |
| 2,465,063 | Schnell | Mar. 22, 1949 |